United States Patent
Shimura et al.

(10) Patent No.: US 7,477,983 B2
(45) Date of Patent: Jan. 13, 2009

(54) EXHAUST GAS DIAGNOSIS SYSTEM AND VEHICLE CONTROL SYSTEM

(75) Inventors: Takanori Shimura, Chiba (JP);
Masayuki Miyazaki, Tokyo (JP);
Kentaro Yoshimura, Paris (FR);
Yuichiro Morita, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 115 days.

(21) Appl. No.: 11/730,583

(22) Filed: Apr. 3, 2007

(65) Prior Publication Data

US 2007/0244622 A1 Oct. 18, 2007

Related U.S. Application Data

(62) Division of application No. 11/071,207, filed on Mar. 4, 2005, now Pat. No. 7,257,481.

(30) Foreign Application Priority Data

Jan. 28, 2005 (JP) .............................. 2005-020548

(51) Int. Cl.
*F02D 45/00* (2006.01)
*B60K 13/00* (2006.01)

(52) U.S. Cl. ...................................... 701/114

(58) Field of Classification Search ................ 701/114, 701/115, 102, 101, 2, 50; 340/825.69
See application file for complete search history.

(56) References Cited

U.S. PATENT DOCUMENTS

| | | | |
|---|---|---|---|
| 4,638,287 A | 1/1987 | Umebayashi et al. | |
| 5,836,639 A | 11/1998 | Kleefeldt et al. | |
| 6,539,295 B1 | 3/2003 | Katzen et al. | |
| 6,778,097 B1 * | 8/2004 | Kajita et al. | 340/825.69 |
| 7,161,464 B2 * | 1/2007 | Yuhara | 340/5.2 |
| 7,257,481 B2 * | 8/2007 | Shimura et al. | 701/114 |
| 2001/0049579 A1 | 12/2001 | Fujino et al. | |
| 2002/0111716 A1 | 8/2002 | Mencher et al. | |
| 2003/0184944 A1 | 10/2003 | Hattori | |
| 2005/0096825 A1 * | 5/2005 | Lee | 701/70 |

FOREIGN PATENT DOCUMENTS

| | | |
|---|---|---|
| DE | 19706393 | 10/1997 |
| DE | 19740732 | 3/1999 |
| EP | 0147110 | 7/1985 |
| GB | 2406170 | 3/2005 |
| JP | 8-51673 A * | 2/1996 |
| JP | 11/165576 | 6/1999 |
| JP | 2003-2019 | 1/2003 |
| WO | 01/25056 | 4/2001 |

* cited by examiner

*Primary Examiner*—Hieu T Vo
(74) *Attorney, Agent, or Firm*—Mattingly, Stanger, Malur & Brundidge, P.C.

(57) ABSTRACT

An exhaust gas diagnosis system and a vehicle control system for automotive vehicles to reduce the communication lines and the power lines connected to the antiweatherability-required exhaust gas sensor arranged on the exterior of the vehicle are disclosed. The exhaust gas diagnosis system is configured of an engine control unit (electronic control unit), radio terminal units having the sensor function to detect the exhaust gas, and a radio communication repeater to conduct communication and share a part of the process executed by the conventional engine control unit. The communication lines between the sensor and the electronic control unit and the power lines to the sensor required in the conventional systems are eliminated while at the same time reducing the load on the electronic control unit.

9 Claims, 14 Drawing Sheets

EXHAUST GAS DIAGNOSIS SYSTEM AND VEHICLE CONTROL SYSTEM

This is a divisional application of U.S. Ser. No. 11/071,207, filed Mar. 4, 2005, now U.S. Pat. No. 7,257,481 B2, issued on Aug. 14, 2007.

INCORPORATED BY REFERENCE

The present application claims priority from Japanese application JP 2005-020548 filed on Jan. 28, 2005, the content of which is hereby incorporated by reference into this application.

BACKGROUND OF THE INVENTION

The present invention relates to a system (observation system, control system, etc.) constructed using a plurality of sensing data, or in particular to an exhaust gas diagnosis system and a vehicle control system for automotive vehicles.

The recent progress of the computerized vehicle control operation has increased the number of microcomputers mounted on a vehicle to more than several tens and also the number of sensors connected thereto. The microcomputers are mounted for the body system, the information system, the drive control system, the steering control system and the power train system of the vehicle to realize a finely detailed control operation and an improved operability. The communication between these microcomputers and between the microcomputers and the sensors is carried out by cables, and the weight of the wire harnesses (wires and connectors) used for this configuration exceeds several tens of kg. Also, the space for wiring in the vehicle is so limited that the wiring space to add new functions has become more and more difficult to secure.

In addition, what is called the X-by-wire technique for reducing the mechanical components of the vehicle has made a progress and come to replace the conventional mechanical and hydraulic control systems to such an extent that the vehicle is now controlled substantially by a combination of a motor and an electronic control unit. To realize the X-by-wire system, an improved reliability is indispensable, and with regard to the electronic control system, the current trend is toward securing the reliability by double or triple system configuration. This trend of the X-by-wire technique also increases the wire harnesses of the automotive vehicle, leading to an even more increased wire harness mass.

To reduce the weight and the fuel consumption of the vehicle by weight reduction, therefore, the wire harness is required to be reduced or the quantity of the wire harness is required to be prevented from increasing. The wire harness may be reduced by radio data communication, and an example thereof is disclosed in JP-A-2003-002019 (Patent Document 1) involving a tire air pressure monitor. Since each tire is rotating, a tire air pressure sensor mounted on the tire valve, etc. and a tire air pressure monitor control unit to monitor the state of the air pressure sensor mounted on the vehicle cannot be directly connected by cable to each other. In the system disclosed in Patent Document 1, a radio communication repeater is arranged on the tire wheel to realize the radio communication, and data are transmitted by radio communication between the tire air pressure sensor and the radio communication repeaters. This radio communication realizes the communication with the rotary component parts.

SUMMARY OF THE INVENTION

The object of this invention is to reduce or suppress the number of wire harnesses and thus to reduce the vehicle weight and power consumption by realizing the radio communication for each control system.

One application of radio communication is an engine control system. The exhaust gas emission control of automotive vehicles is restricted more strictly than ever before and an exhaust gas control system to remove the obnoxious components of the exhaust gas is required. The exhaust gas control system includes a catalytic converter and an exhaust gas sensor, in which the exhaust gas components such as CO, NOx and HC are removed by the catalytic converter and the exhaust gas components are monitored by the exhaust gas sensor. This exhaust gas control system is normally installed on the outside part of the vehicle (under the vehicle body). Therefore, the communication signal lines and the power lines for the exhaust gas sensor are exposed to atmospheric environments and require a high antiweatherability (robust against ambient temperature, vibration, shock, etc.), thereby posing the problem of a heavy and expensive wire material and connectors.

To reduce the exhaust gas components and improve the fuel consumption, on the other hand, the engine control unit is required to perform a more finely detailed control operation. The problem is, however, is that the operating frequency of the engine control unit and the program size of the engine control unit increase. This adds to the problem of an increased power consumption and cost of the engine control unit.

The basic configuration of the conventional exhaust gas diagnosis system is explained with reference to FIG. 5. The exhaust gas diagnosis system comprises an engine control unit 4010, exhaust gas sensors 411, 412 and a catalytic converter 6010. The engine control unit 4010 is arranged inside the vehicle, while the exhaust gas sensors 411, 412 and the exhaust pipe 6000 outside the vehicle. In the conventional exhaust gas diagnosis system, therefore, the communication signal lines 7011, 7012 connecting the exhaust gas sensors 411, 412 and the engine control unit 4010 and the power lines 7021, 7022 to supply power to the exhaust gas sensors are wired outside the vehicle, and therefore are required to use a wire material and connectors high in antiweatherability. As a result, these wire material and connectors are both heavy and expensive.

FIG. 6 shows the exhaust gas diagnosis sequence according to an exhaust gas diagnosis program of the exhaust gas diagnosis system shown in FIG. 5. The exhaust gas diagnosis program is incorporated in a memory (mainly, a nonvolatile memory) in the engine control unit 4011 and executed by the microcomputer in the engine control unit 4011. This program constitutes one of the subroutines of the engine control program, and is executed at regular time intervals. The exhaust gas diagnosis sequence is described below.

Specifically, the injection fuel amount and the intake air mount are controlled at step S110. The waiting time before detection of the exhaust gas is set in the internal timer of the microcomputer at step S111. At step S112, an interrupt from a timer indicating the lapse of a predetermined time is waited for at step S112, and upon receipt of the interrupt, step S113 is executed. At step S113, the sensing information on the exhaust gas is read from the exhaust gas sensors 411, 412. At step S114, the signal data on the exhaust gas sensor that has been read is processed. In the case where the data contains considerable noises, the process is executed to remove the noises, for example, by such averaging means as smoothing. At step S115, the data on the exhaust gas sensor on which the signal has been processed is checked to determine whether it exceeds a reference value or not. In the case where the data on the exhaust gas sensor is found abnormal at step 5116, the process of step 5117 is executed. In the case where the data is normal at step 5116, on the other hand, the process is returned to the engine control program. At step S117, the abnormality of the data on the exhaust gas sensor is notified to the vehicle overall control unit 5010, and the process is returned to the engine control program.

As described above, all the processes of the exhaust gas diagnosis program shown in FIG. 6 are executed in the engine control unit 4010. Therefore, the microcomputer for controlling the engine requires a high operating frequency, and the flash memory and the RAM included as a chip in the microcomputer for controlling the engine require a large memory capacity. These requirements can be met at the sacrifice of large power consumption and high cost of the microcomputer for controlling the engine.

To solve the problems described above, according to one aspect of this invention, there is provided a vehicle control system comprising a vehicle control unit to control a vehicle device, a radio terminal unit having a sensor to monitor the vehicle condition, and a radio communication repeater to receive, by radio communication, the vehicle condition detected by the sensor of the radio terminal unit, wherein the radio communication repeater includes a memory having stored therein a program to determine the vehicle condition, and the radio communication repeater, upon receipt of a start signal from the vehicle control unit, executes the program and outputs the result of determination of the vehicle condition.

According to another aspect of the invention, there is provided a vehicle control system comprising a vehicle control unit to control a vehicle device, a radio terminal unit having a sensor to monitor the condition of a vehicle component part, a first radio communication repeater to receive, by radio communication, the condition of the vehicle component part detected by the sensor of the radio terminal unit, and a vehicle overall control unit connected to the first radio communication repeater, wherein the first radio communication repeater includes a memory having stored therein a program to determine the condition of the vehicle component part, wherein the first radio communication repeater executes the program to monitor the condition of the vehicle component part and upon detection of a predetermined change in the vehicle component part, outputs the result of determination on the condition of the vehicle component part to the vehicle overall control unit, and wherein the vehicle overall control unit transmits the first control information corresponding to the predetermined change of the vehicle component part received to the vehicle control unit.

According to still another aspect of the invention, there is provided a vehicle control system comprising a second radio communication repeater to receive the external information transmitted from outside the vehicle, wherein the external information received by the second radio communication repeater is transmitted to the first radio communication repeater, wherein the first radio communication repeater includes a memory having stored therein a program to determine the contents of the external information, wherein the first radio communication repeater executes the program to monitor the contents of the external information, and upon detection of a change in the contents of the external information, outputs the external information to the vehicle overall control unit, and wherein the vehicle overall control unit transmits the second control information corresponding to the external information received to the vehicle control unit.

According to this invention, the highly improved functions of the system using the radio communication can be implemented at low cost.

Other objects, features and advantages of the invention will become apparent from the following description of the embodiments of the invention taken in conjunction with the accompanying drawings.

DESCRIPTION OF THE EMBODIMENTS

Embodiments of the invention are explained below with reference to the drawings.

First Embodiment

Figure 1:
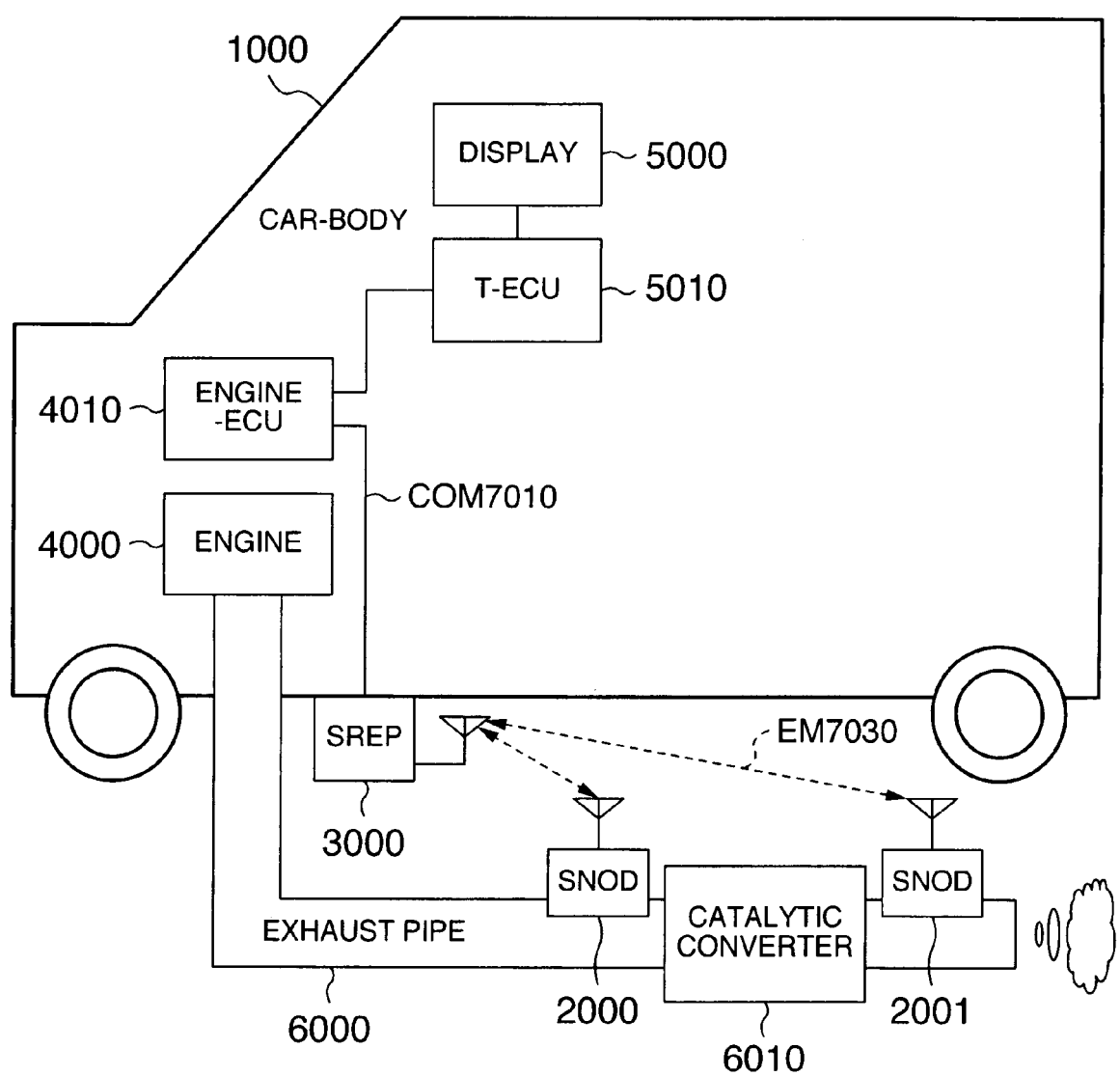
FIG. 1 is a diagram showing a configuration according to a first embodiment of the invention.

A first embodiment is shown in FIG. 1. An exhaust gas diagnosis system comprises an engine control unit 4010, radio terminal units 2000, 2001 having the sensor function of detecting the exhaust gas, a catalytic converter 6010 and a radio communication repeater 3000. The sensor of the first radio terminal unit 2000 measures the exhaust gas flowing into the catalytic converter 6010 and the sensor of the second radio terminal unit 2001 measures the exhaust gas flowing out from catalytic converter 6010. The engine control unit 4010 is arranged inside the vehicle, while the radio terminal units 2000, 2001 having the sensor function, the catalytic converter 6010 and the radio communication repeater 3000, together with the exhaust gas pipe 6000, are arranged on the exterior of the vehicle body. The engine control unit 4010 and the radio communication repeater 3000 are wired inside the vehicle by a communication signal line 7010. The radio communication between the radio communication repeater 3000 and the radio terminal units 2000, 2001 with the sensor function eliminates the wire material and the connectors having a superior anti-weatherability which otherwise might be required for the signal communication lines used outside the vehicle body.

The power line may be arranged on the exterior of the vehicle. In order to reduce the wire harnesses, however, the radio communication repeater 3000 and the radio terminal units 2000, 2001 advantageously include a power supply. A vibration-to energy conversion circuit, for example, as well as an ordinary battery can be used as a power supply, and the power lines to these devices are eliminated. The vibration-to-energy conversion circuit is a device to convert the vibration energy into the electrical energy, and unlike the battery, has the advantage that the change thereof is not required.

It is also possible to use a thermo electric power generator as a power supply to convert the heat of the exhaust pipe 6000 into electricity utilizing the fact that the exhaust pipe reaches a high temperature.

The radio terminal units 2000, 2001 having the sensor function are operated by the power supplied from this thermo electric power generator.

The foregoing explanation is concentrated on the exhaust gas diagnosis system. In the configuration shown in FIG. 1, reference numeral 1000 designates an automotive vehicle, numeral 4000 an engine, and numeral 5000 a display unit. The radio communication repeater 3000, for example, is fixed on the lower part (such as a frame member) of the vehicle body. The engine control unit 4010 measures the exhaust gas before and after the catalytic converter 6010 and notifies any fault, if detected, to the vehicle overall control unit 5010. The vehicle overall control unit 5010 notifies the fault of the exhaust gas to the driver through the display unit 5000.

Figure 2:
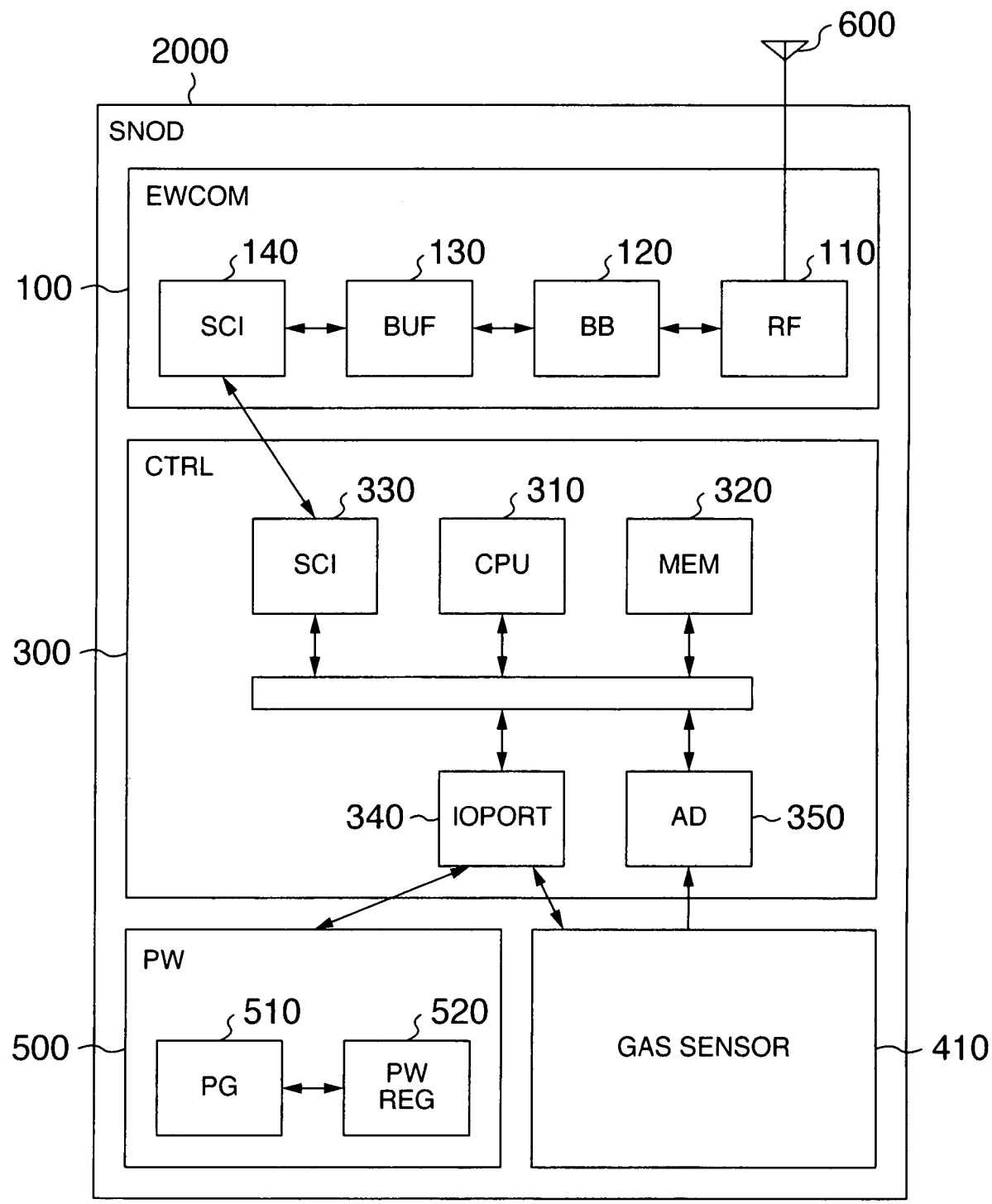
FIG. 2 is a diagram showing the configuration of the radio terminal unit having a function as a sensor according to the first embodiment.

The configuration of the radio terminal unit 2000 having the sensor function with a built-in power supply is shown in FIG. 2. The radio terminal unit 2000 having the sensor function is configured of an antenna 600, a radio communication circuit 100, a control circuit 300, an exhaust gas sensor 410 and a power generating circuit PW500. The radio frequency band of 300 MHz, 400 MHz, 2.4 GHz, etc. and the baseband frequency band of several tens of MHz are assumed.

The radio communication circuit includes a RF circuit 110, a baseband circuit 120, a data buffer 130 and a serial communication circuit 140. The RF circuit 110 converts the communication data of the radio frequency band and the baseband frequency signal from one to the other. In the transmitting operation, the baseband frequency signal is modulated into the radio frequency band signal while at the same time controlling the transmission output and the transmission frequency. In receiving operation, on the other hand, the radio frequency band signal is received, a specified frequency is selected from the received signal through a filter, and the selected signal is amplified to a signal level capable of signal processing and transferred to the baseband circuit 120.

The baseband circuit BB120 converts the baseband communication data and the serial digital data from one to the other. In the transmitting operation, the serial data sent from the serial communication circuit 140 is modulated into the baseband complex signal (I, Q). In this case, the serial communication circuit 140 and the baseband circuit 120 are synchronized with each other using a data buffer 130. The data buffer 130 makes possible the synchronous operation of the baseband circuit 120 and the serial communication circuit 140. The transfer rate of the serial data is about several hundred bps to several tens of MHz. In receiving operation, the baseband signal output from the RF circuit 110 is demodulated to reproduce the clock signal providing the sync signal of the serial data, and based on the timing of this signal, the serial data is demodulated.

The control circuit 300 controls the whole radio terminal unit 2000 having the sensor function, and includes a microcomputer 310, a memory 320, a serial communication circuit 330, an I/O port 340 and an A/D converter 350. These circuits are connected by a bus.

The microcomputer 310 is a CPU of 8 or 16 bits and used for the control operation. The operation of the microcomputer 310 is synchronized by the clock to execute the program stored in the memory 320. The memory 320 is configured of a nonvolatile memory and a RAM. The control program, the initialization data and the crucial data are stored in the nonvolatile memory capable of holding the data in case of power failure. The RAM is used as a working area for conducting the arithmetic operation, processing the signal and holding the sensor data.

The serial communication circuit 330 conducts communication with the serial communication circuit 140 in the RF circuit 110. In transmitting operation, the microcomputer 310 converts the sensor data, the signal-processed data and the error information to the serial data through the serial communication circuit 330 and transfers them to the RF circuit 110. In receiving operation, on the other hand, the serial data output from the RF circuit 110 are converted to the parallel data (8, 16 or 32 bits) by the serial communication circuit 330, and the data thus converted are processed in the microcomputer 310.

The I/O port 340 controls the power generating circuit 500 and the exhaust gas sensor 410. Also, the I/O port 340 receives the digital output signals (interrupt signal, status signal, etc.) outputted by the power generating circuit 500 and the exhaust gas sensor 410.

The A/D converter 350 fetches the analog output from the exhaust gas sensor 410 and converts it into a digital data. The conversion accuracy into the digital data is about 8 to 16 bits.

The power generating circuit 500 is configured of a vibration-to-energy conversion circuit 510 and a regulator 520. In the vibration-to-energy conversion circuit 510, power is generated, for example, by a method in which the capacitance of a capacitor is changed in accordance with the motion of a spring having a weight, and this capacitance change is recovered as electrical energy. In another method, a piezoelectric device is oscillated and the electromotive force generated by the deformation of the piezoelectric device is utilized. The electromotive force thus generated is converted into a stable voltage by the regulator 520 and supplied to the radio terminal unit 2000 having the sensor function.

The exhaust gas sensor 410 detects the harmful components contained in the exhaust gas, and monitors components such as CO, NOx and HC in the exhaust gas.

Figure 3:
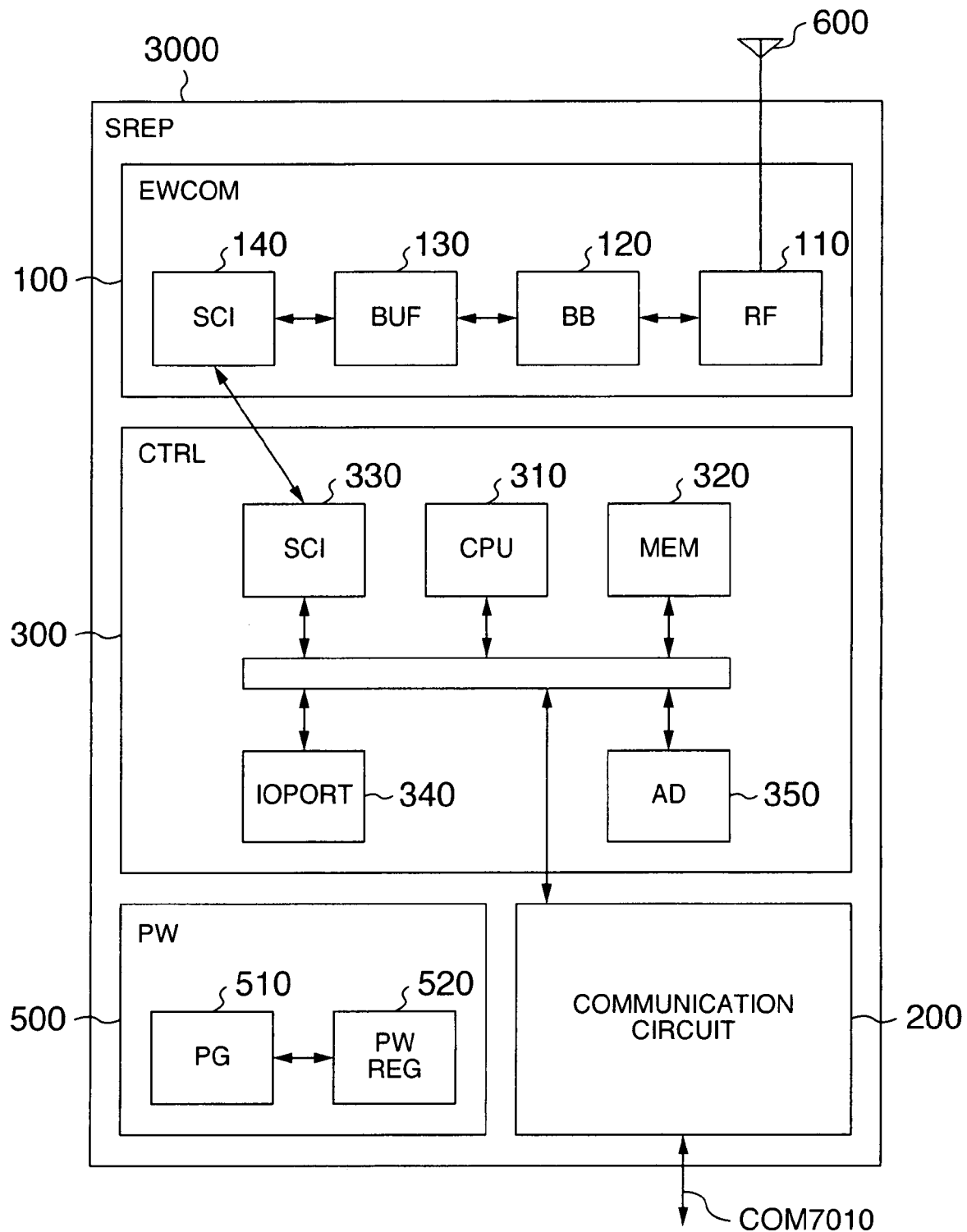
FIG. 3 is a diagram showing the configuration of the radio communication repeater according to the first embodiment.

FIG. 3 shows a configuration of the radio communication repeater 3000 having a built-in power supply. The radio communication repeater 3000 includes an antenna 600, a radio communication circuit 100, a cable communication circuit 200, a control circuit 300 and a power generating circuit 500. The antenna 600, the radio communication circuit 100, the control circuit 300 and the power generating circuit 500 are substantially identical to those included in the configuration of the radio communication repeater 2000. The radio communication repeater 3000 has the function of the cable communication circuit 200 at the same time.

The cable communication circuit 200 is a communication bus interface circuit used for data communication with other on-vehicle control units.

Several bus standards are specified in accordance with applications of the on-vehicle communication devices. A typical bus standard for the control operation of the windows, the door locks and the mirrors is LIN (Local Interconnect Network). The data transfer rate is at least about 125 kbps. For the real-time control system, on the other hand, the bus standard called CAN (Controller Area Network) is used. The data transfer rate is about 1 Mbps. The bus standard for the X-by-wire (free of hydraulic and mechanical operation) is FlexRay. The data transfer rate under this standard is about 10 Mbps. The cable communication circuit 200 is a bus interface circuit having the function of at least one of these bus standards, and operates under the control of the control circuit 300.

Figure 4:
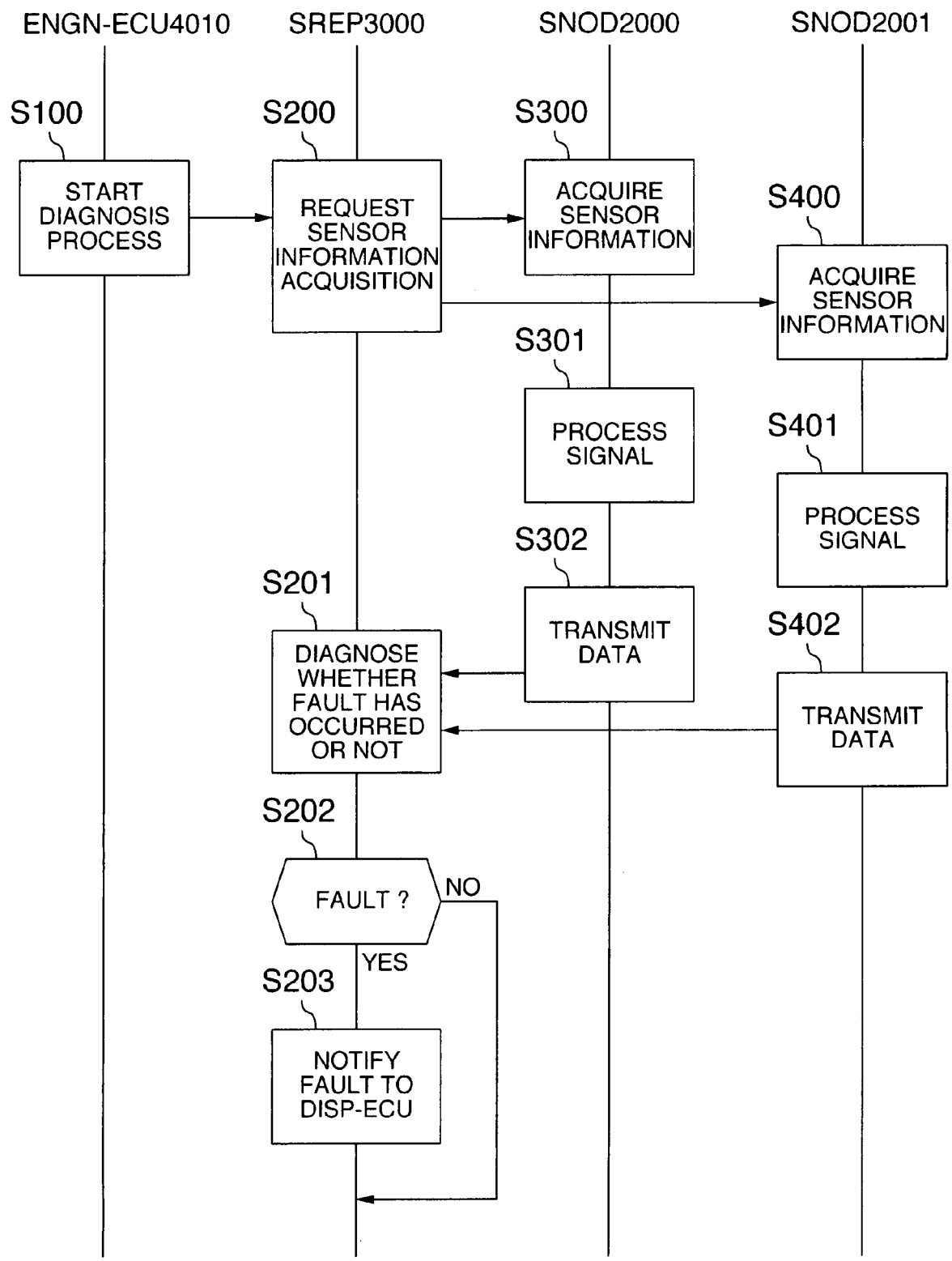
FIG. 4 is an exhaust gas system diagnosis sequence chart according to the first embodiment.
Figure 5:
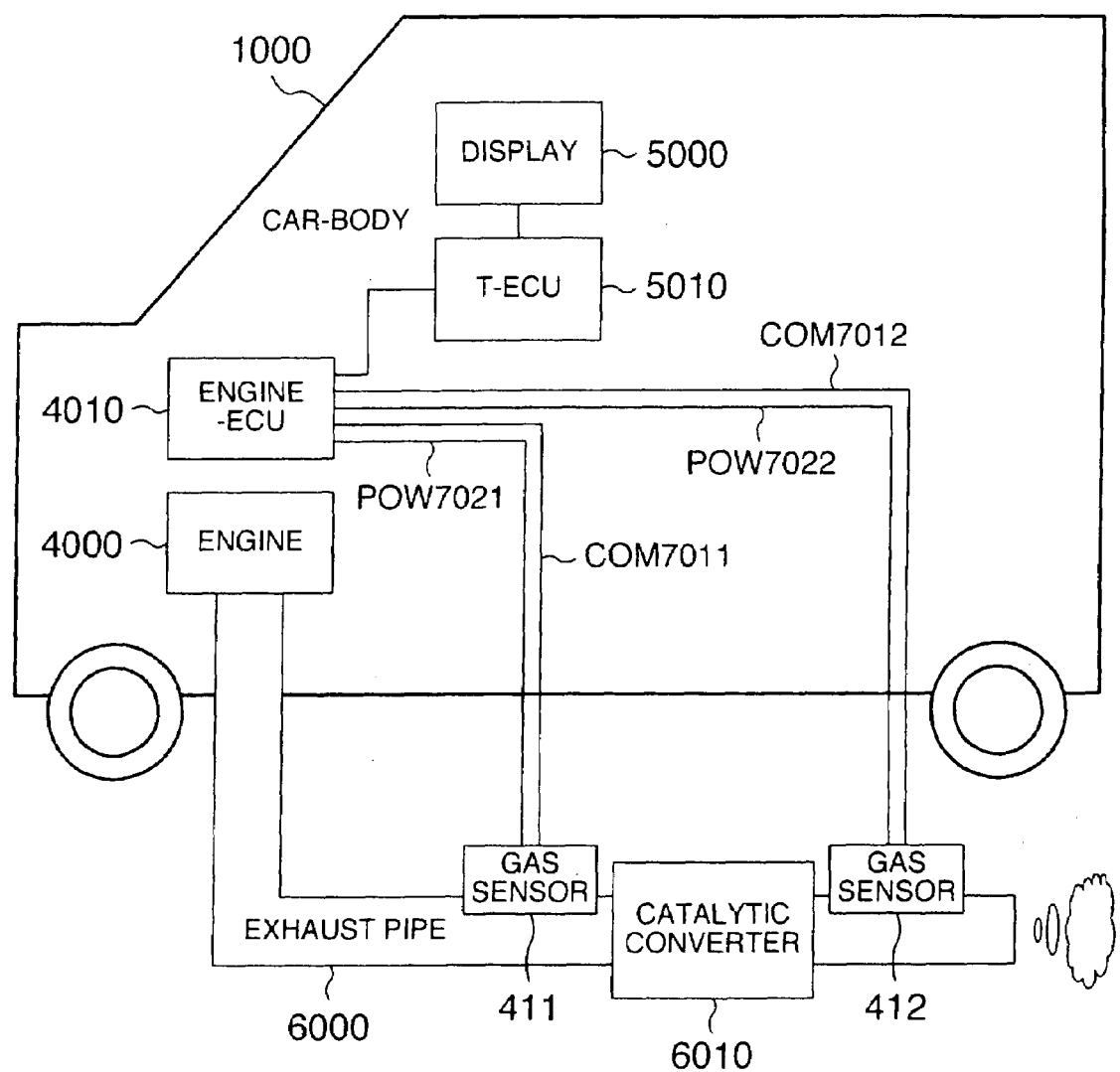
FIG. 5 is a diagram showing the configuration of the conventional exhaust gas diagnosis system.
Figure 6:
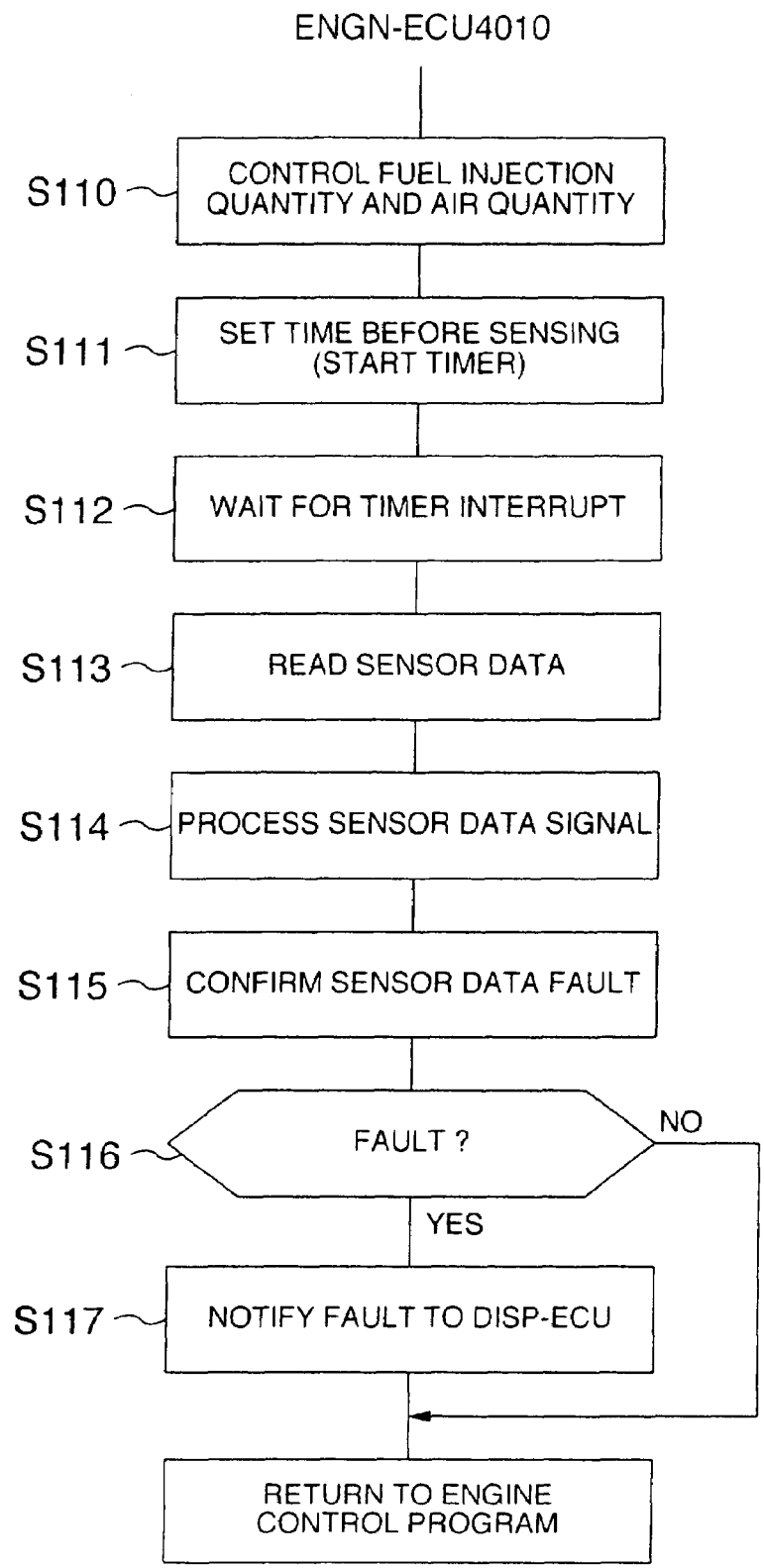
FIG. 6 is a diagnosis sequence chart for the conventional exhaust gas diagnosis system.

FIG. 4 is an exhaust system diagnosis sequence chart of the exhaust gas diagnosis system shown in FIG. 1. The exhaust gas diagnosis program is divided into (1) the portion stored in the memory (mainly, a nonvolatile memory) of the engine control unit 4010 and executed by the microcomputer in the engine control unit 4010, (2) the portion stored in the memory 320 of the radio communication repeater 3000 and executed by the microcomputer 310 in the radio communication repeater 3000, and (3) the portion stored in the memory 320 of the radio terminal units 2000, 2001 having the sensor function and executed by the microcomputer 310 in the radio terminal units having the sensor function. These programs collaborate with each other to execute the exhaust gas diagnosis sequence. The exhaust gas diagnosis sequence program is one of the subroutines of the engine control program and executed at regular time intervals. The control flow is described below.

At step S100, a start signal to execute the exhaust gas diagnosis sequence program is transmitted by the engine control unit 4010 to the radio communication repeater 3000 using the communication signal line 7010. Though not shown, the engine control unit 4010 controls the engine for exhaust gas diagnosis. At step 5200, the radio communication repeater 3000, upon receipt of the start signal from the engine control unit 4010, transmits a sensor information acquisition request to the radio terminal units 2000, 2001 having the sensor function. This acquisition request is transmitted by radio communication (using the radio wave EM7030 for radio communication). At step 300, the radio terminal unit 2000 having the sensor function, upon receipt of the request from the radio communication repeater 3000, acquires the state of the exhaust gas through the exhaust gas sensor 410 of the radio terminal unit 2000 having the sensor function. At step 301, the radio terminal unit 2000 having the sensor function processes the signal to remove noises and compress the sensor data acquired. At step S302, the radio terminal unit 2000 having the sensor function transmits the sensor data signal processed to the radio communication repeater 3000. At step S400, the radio terminal unit 2001 having the sensor function, in response to the request from the radio communication repeater 3000, acquires the state of the exhaust gas through the exhaust gas sensor 410 in the radio terminal unit 2001 having the sensor. At step 401, the radio terminal unit 2001 having the sensor function processes the signal to remove noises and compress the sensor data acquired. At step 5402, the radio terminal unit 2001 having the sensor function transmits the sensor data signal processed to the radio communication repeater 3000. At step S201, the radio communication repeater 3000 analyzes the sensor data sent from the radio terminal units 2001, 2001 having the sensor function. At step S202, the exhaust gas state is checked for any fault. As step S203, any fault which may be detected is sent to the vehicle overall control unit 5010, which displays the fault on the display unit 5000 on the dashboard or the like to notify the fault to the driver.

As explained above, none of the processes in the exhaust gas diagnosis sequence shown in FIG. 4 is executed by the engine control unit 4010. Instead, the engine control unit 4010 simply starts the exhaust gas diagnosis sequence. As a result, the increase in the operating frequency of the microcomputer for controlling the engine, which constitutes a key device of the engine control unit 4010, is suppressed while at the same time preventing the increase in the capacity of the RAM and the flash memory incorporated as a chip in the microcomputer. In this way, the cost and the power consumption of the engine-controlling microcomputer are prevented from increasing.

Also, the radio communication interface between the radio communication repeater and the radio terminal unit having the sensor function facilitates the job of installation and removal of the radio terminal unit having the sensor function. This also facilitates the vehicle maintenance and the development of new vehicle models.

Second Embodiment

Figure 7:
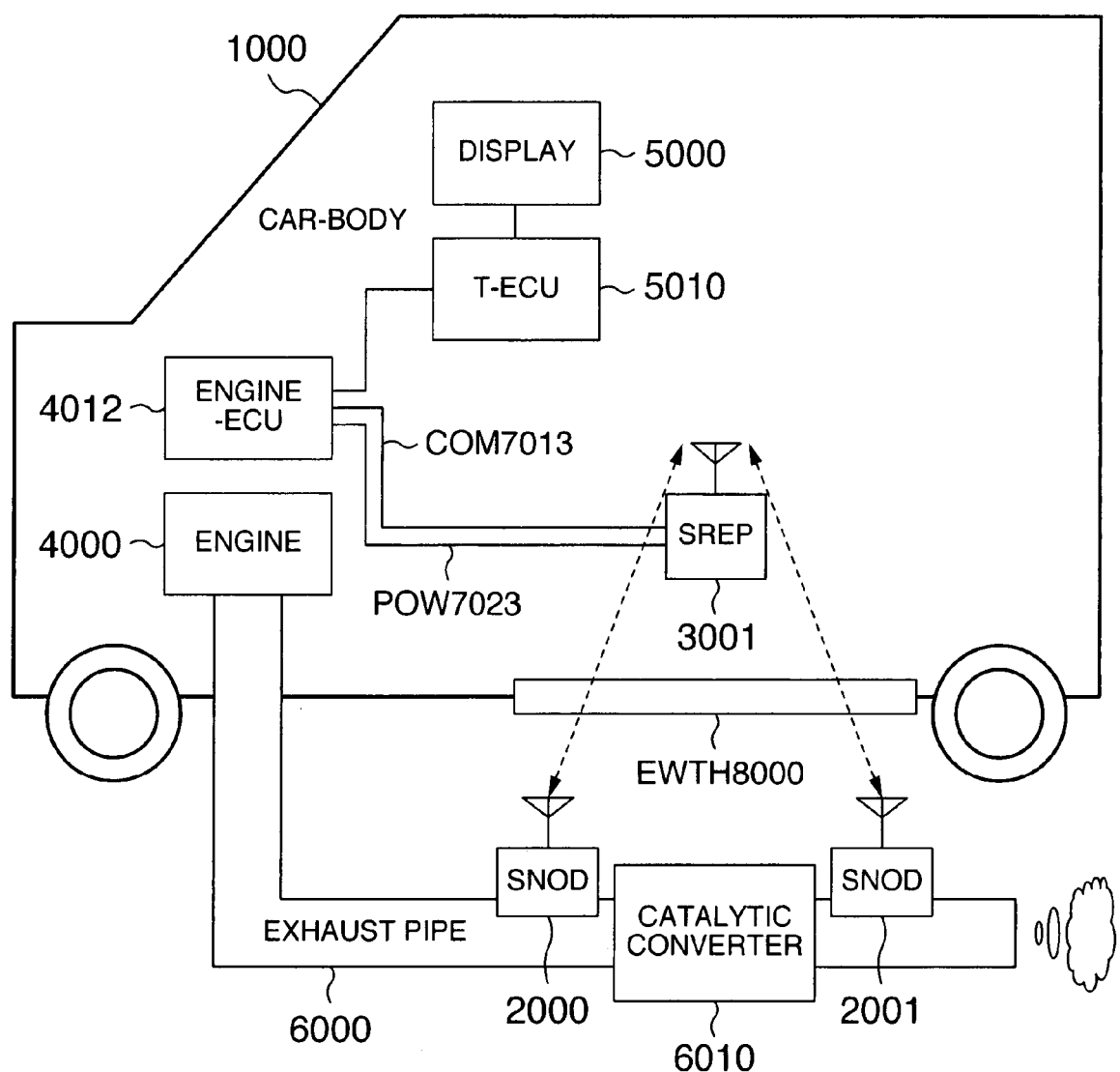
FIG. 7 shows the configuration according to a second embodiment of the invention.

A second embodiment of the invention is shown in FIG. 7. According to this embodiment, the radio communication repeater 3001 is mounted inside the vehicle. In this case, to secure a radio communication path between the radio communication repeater 3001 and the radio terminal units 2000, 2001 having the sensor function, a radio wave propagator 8000 to make possible radio communication is arranged in the lower part of the vehicle.

Normally, the lower part (undercarriage) of the vehicle is protected by an iron plate or the like metal member and not constructed to propagate the radio wave. Therefore, the radio wave propagator 8000 formed of a material such as plastics or resin to pass the radio wave is arranged in the lower part of the vehicle, or preferably, at the portion having the best quality of radio communication between the radio communication repeater 3001 and the radio terminal units 2000, 2001 having the sensor function.

Figure 8:
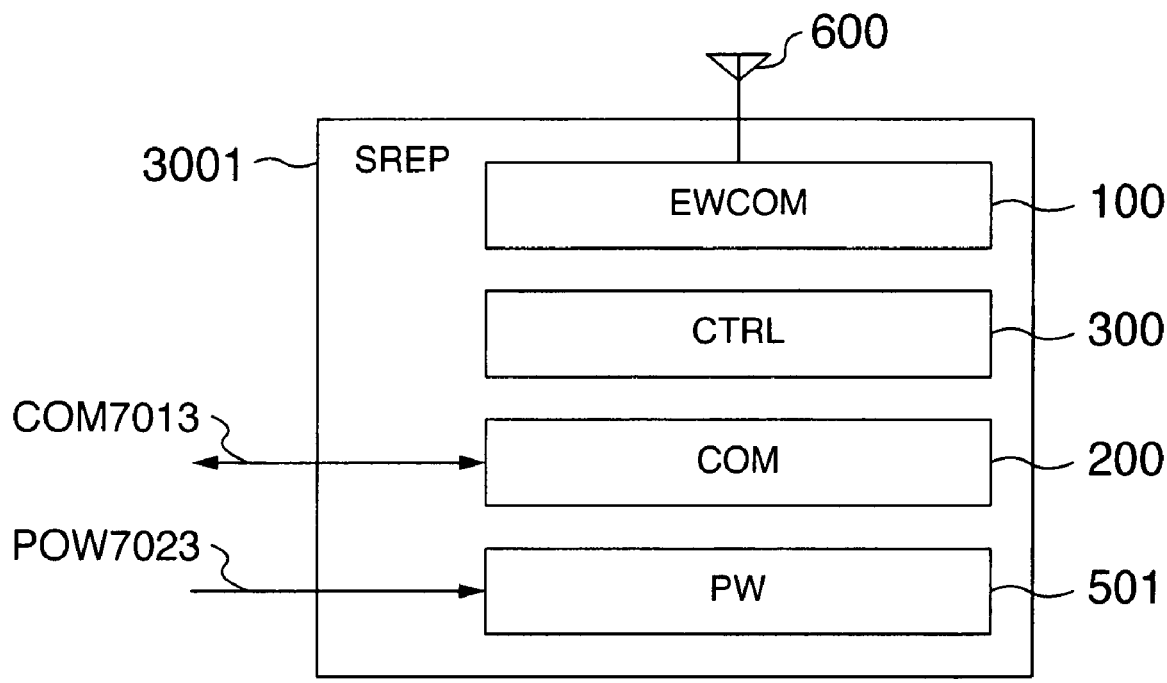
FIG. 8 is a diagram showing the configuration of the radio communication repeater according to the second embodiment.

The vibration of the interior of the vehicle in which the radio communication repeater 3001 is arranged is damped by the bumper. This may reduce the efficiency of the oscillatory power generation. Therefore, the power for the radio communication repeater 3001 is preferably supplied by a battery or a power line. FIG. 8 shows an example of the configuration of the radio communication repeater 3001. The radio communication repeater 3001 is connected to and supplied with power from a power line 7023.

In the manner described above, the radio communication repeater 3001 is mounted inside the vehicle, thereby eliminating the need of mounting it on the exterior of the vehicle exposed to the rigid environments.

A window made of a radio wave transmission material is described as an example of the radio wave propagator 8000. As an alternative, the radio wave propagator 8000 may be configured of a receiver and a booster. Specifically, the signal is received from inside the vehicle, amplified and transmitted out of the vehicle, which signal is received, amplified and transmitted into the vehicle.

Third Embodiment

Figure 9:
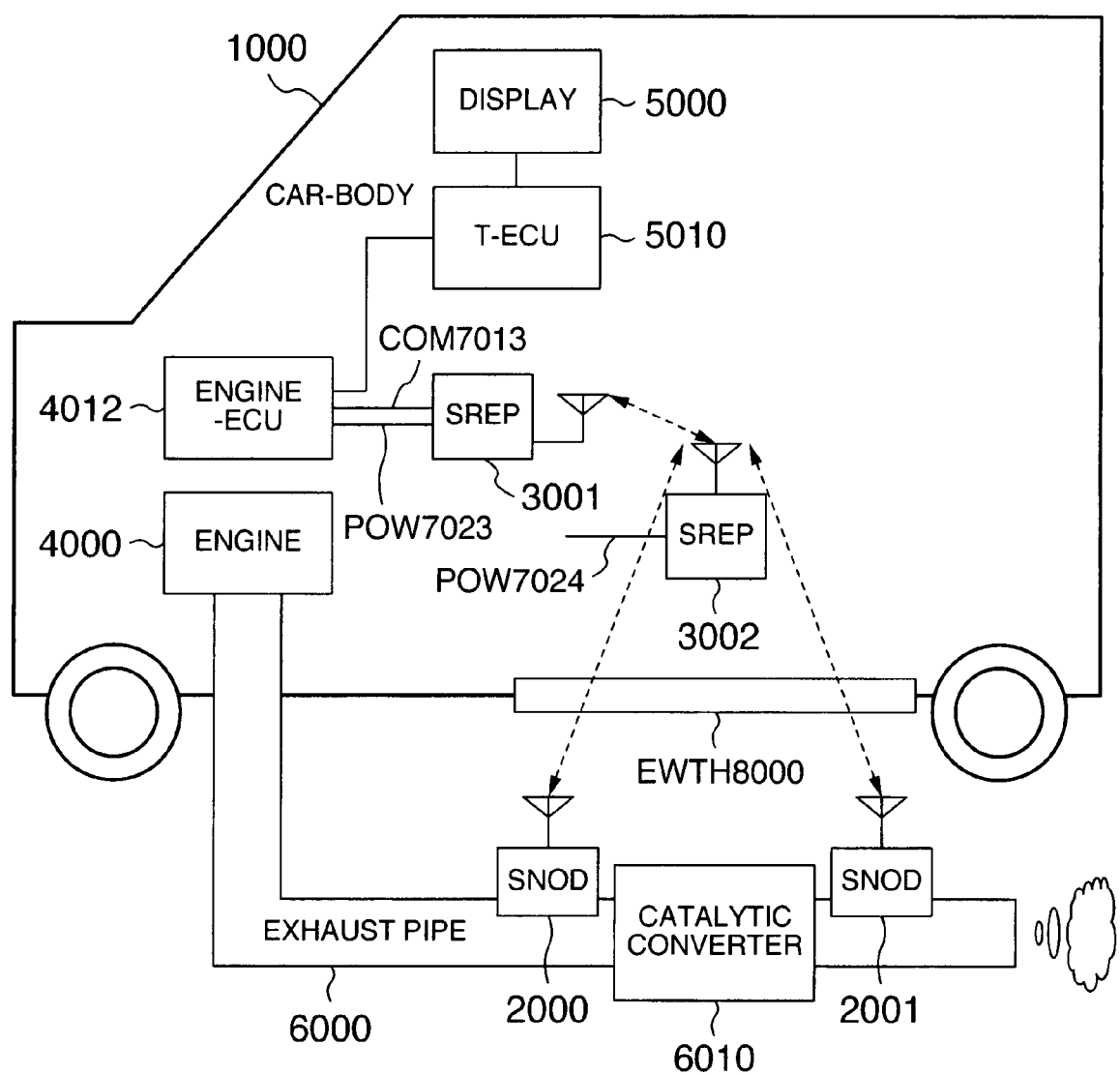
FIG. 9 is a diagram showing the configuration according to a third embodiment of the invention.

FIG. 9 shows a third embodiment of the invention. According to this embodiment, the engine control unit 4012 and the radio communication repeater 3002 are connected by radio wave, so that the exhaust gas diagnosis sequence can be started by the data communication using the radio wave. To realize this system, two radio communication repeaters including a first radio communication repeater 3001 communicable with the engine control unit 4012 and a second radio communication repeater 3002 communicable with the radio terminal units 2000, 2001 having the sensor function are prepared, and the first radio communication repeater 3001 is connected to the engine control unit 4012 by cable while the second radio communication repeater 3002 is arranged above the radio wave propagator 8000.

This configuration can construct the shortest wiring path (communication signal line, power line) between the first radio communication repeater 3001 and the engine control unit 4012. Also, the communication signal lines for the second radio communication repeater 3002 can be reduced, and the power line 7024 is connected to a power supply or a power line nearest to the second radio communication repeater 3002. As a result, the wiring and connections of the communication signal lines and the power lines inside the vehicle are easily designed and laid.

Figure 10:
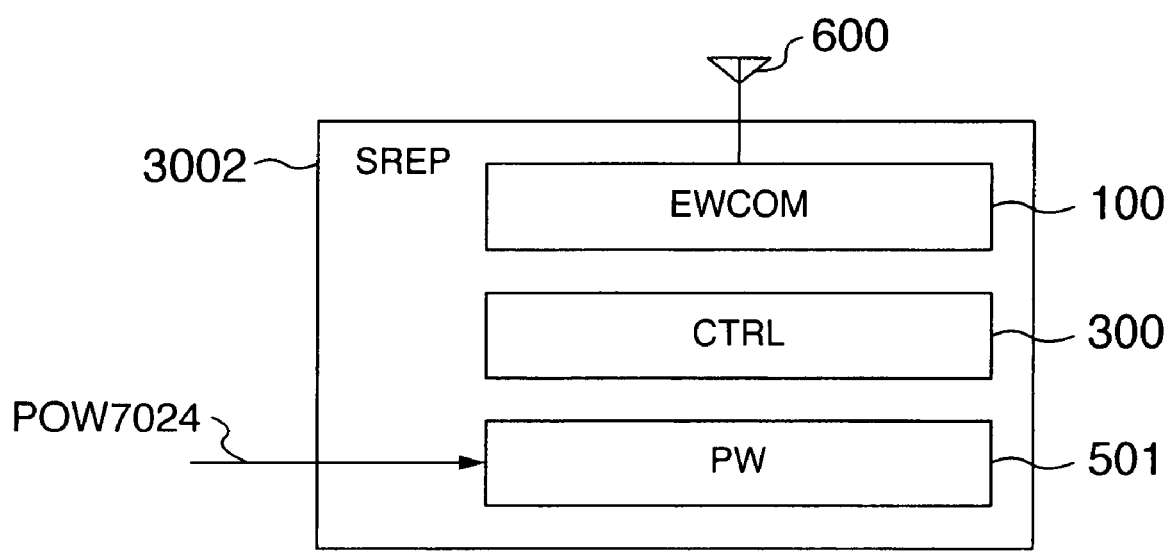
FIG. 10 is a diagram showing the configuration of the radio communication repeater according to the third embodiment.

FIG. 10 shows a configuration of the radio communication repeater 3002 according to this embodiment. In this embodiment, the signal wiring is eliminated, and therefore, the radio communication repeater 3002 can be configured of a radio communication circuit 100, a control circuit 300 and a power circuit 501.

Fourth Embodiment

Figure 11:
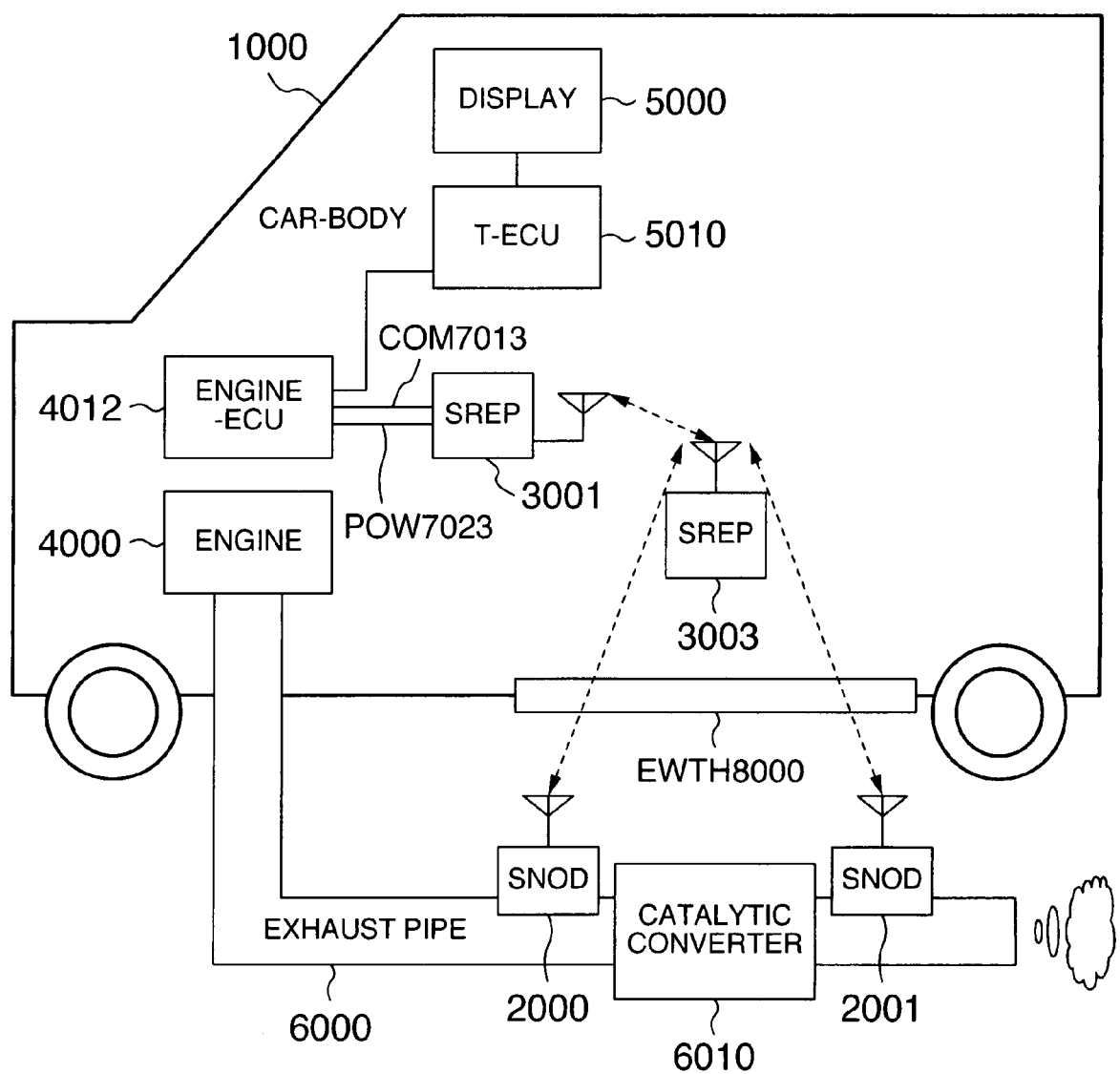
FIG. 11 shows the configuration according to a fourth embodiment of the invention.

FIG. 11 shows a fourth embodiment of the invention. According to this embodiment, in order to eliminate the power lines of the radio communication repeater 3003 for radio communication with the radio terminal units 2000, 2001 having the sensor function, an oscillatory power generator or a battery is used as a power supply for the radio communication repeater 3003.

The power generating circuit 500 is preferably configured of an oscillatory power generator or a battery. The interior of the vehicle may be subjected to lesser vibrations. In the case where sufficient power cannot be secured by the oscillatory power generator, therefore, a hybrid configuration of an oscillatory power generator and a battery is employed so that the shortage of power supplied by the oscillatory power generation may be covered by the battery. This configuration eliminates the need of the wiring of the radio communication repeater 3003, and the freedom of arranging the radio communication repeater 3003 is increased thereby to facilitate the design and package of the exhaust gas diagnosis system.

Figure 12:
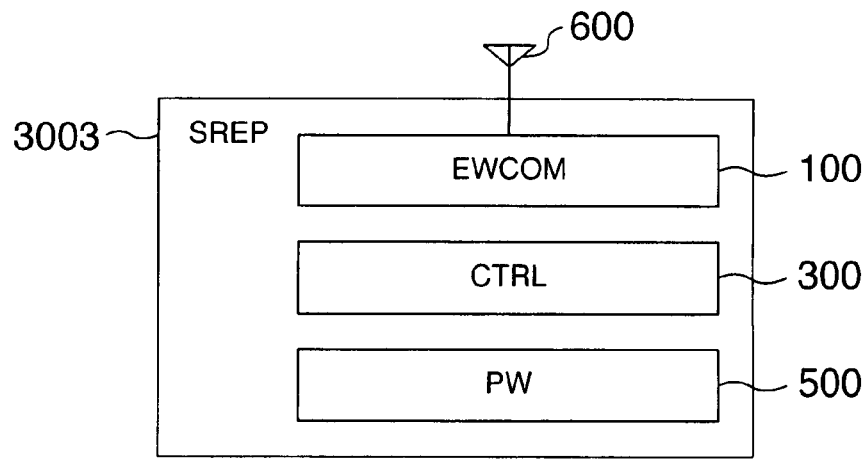
FIG. 12 is a diagram showing the configuration of the radio terminal unit having the sensor function according to the fourth embodiment of the invention.

FIG. 12 shows a configuration of the radio communication repeater 3003 according to this embodiment. According to this embodiment, the wiring of the communication signal lines and the power lines is eliminated, and therefore, the radio communication repeater 3003 can be configured of a radio communication circuit 100, a control circuit 300 and a power generating circuit 500.

Fifth Embodiment

Figure 13:
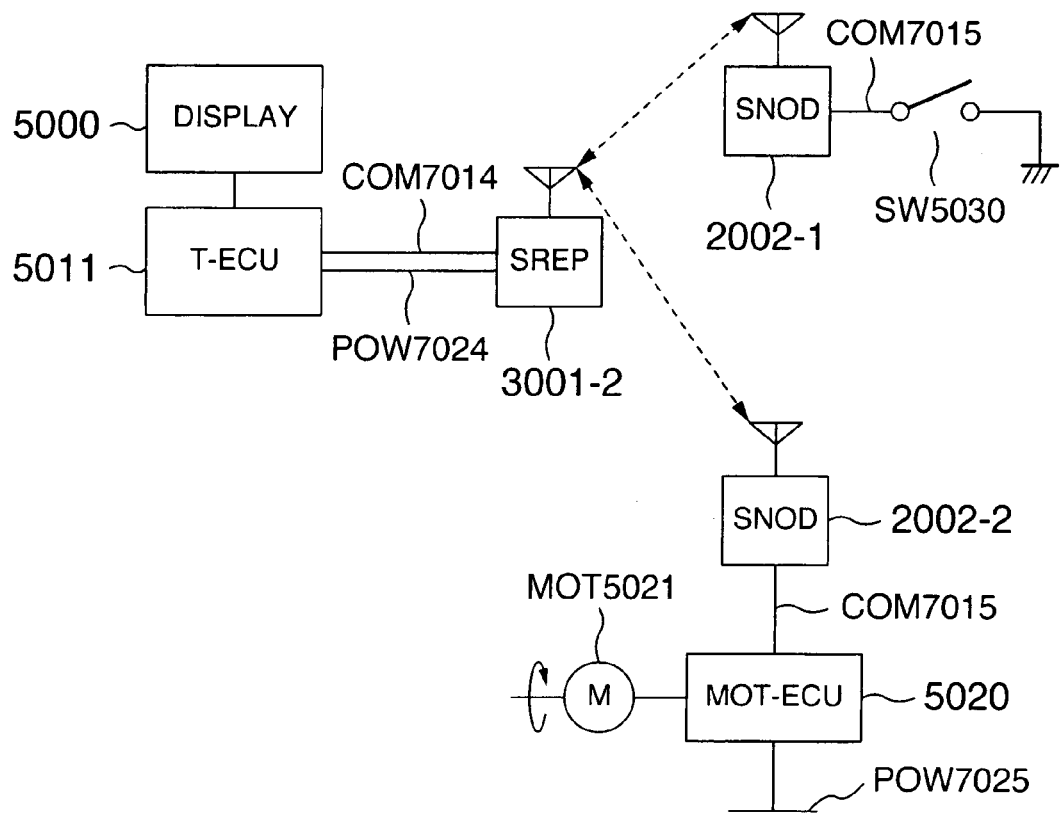
FIG. 13 is a diagram showing the configuration for radio communication according to a fifth embodiment of the invention.

The first to fourth embodiments represent a case in which the engine constituting a vehicle component device is controlled by the engine control unit as a vehicle control unit. Nevertheless, the object controlled by the vehicle control unit with the radio terminal unit having the sensor function and the radio communication repeater is not limited to the engine. The door locks mounted inside and outside the vehicle (frame), the power windows, the detection of seat positions, the switches on the dashboard, the mirrors and the lights are some other examples of application of the same configuration. The fifth embodiment of the invention is shown in FIG. 13.

First, an explanation is given about an example in which the state of a power window switch is monitored. In this embodiment, the radio terminal unit 2002-1 having the sensor function monitors the power window switch 5030 and transmits the switch on/off information to the radio communication repeater 3001-2 by radio communication. The radio communication repeater 3001-2 transmits the power window on/off information to the vehicle overall control unit 5011. The vehicle overall control unit 5011 displays the particular information on the display unit 5000. Next, an example in which a motor is controlled is explained. The vehicle overall control unit 5011, in response to the power window switch on/off information from the radio terminal unit 2002-1 having the sensor function, transfers the particular information to the radio terminal unit 2002-2 having the sensor function through the radio communication repeater 3001-2. The radio terminal unit 2002-2 having the sensor function transfers the power window on/off information to a motor control unit 5020. In accordance with the same information, the motor control unit 5020 controls the power window 5021.

In the operating sequence according to this embodiment, unlike in the exhaust gas diagnosis sequence shown in FIG. 4, the start signal is not output from the vehicle control unit (the motor control unit in the case under consideration). Instead, the radio communication repeater 3001 acquires the sensor information from the radio terminal unit 2002-1 at regular time intervals, or a predetermined program is executed based on the sensor information acquired by the radio communication repeater 3001 from the radio terminal unit 2002-1 at irregular time intervals, and the result thereof is notified to the vehicle overall control unit 5011. The information acquired by a plurality of the radio terminal units 2002-1, 2002-2 and accumulated are analyzed in its entirety by the vehicle overall control unit 5011 and an operating instruction is given to the motor control unit as required. As a result, the increase in the operating frequency of the microcomputer for the control operation of the vehicle overall control unit 5011 is suppressed while at the same time preventing the capacity of the flash memory and the RAM mounted as a chip in the microcomputer from being increased. Consequently, both the cost and power consumption of the microcomputer for the vehicle overall control unit can be saved.

According to this embodiment, the power window on/off information is transferred as data through the radio communication repeater. As long as radio communication is possible between the radio terminal units having the sensor function, however, the data communication can alternatively is conducted between the radio terminal units having the sensor function.

Figure 14:
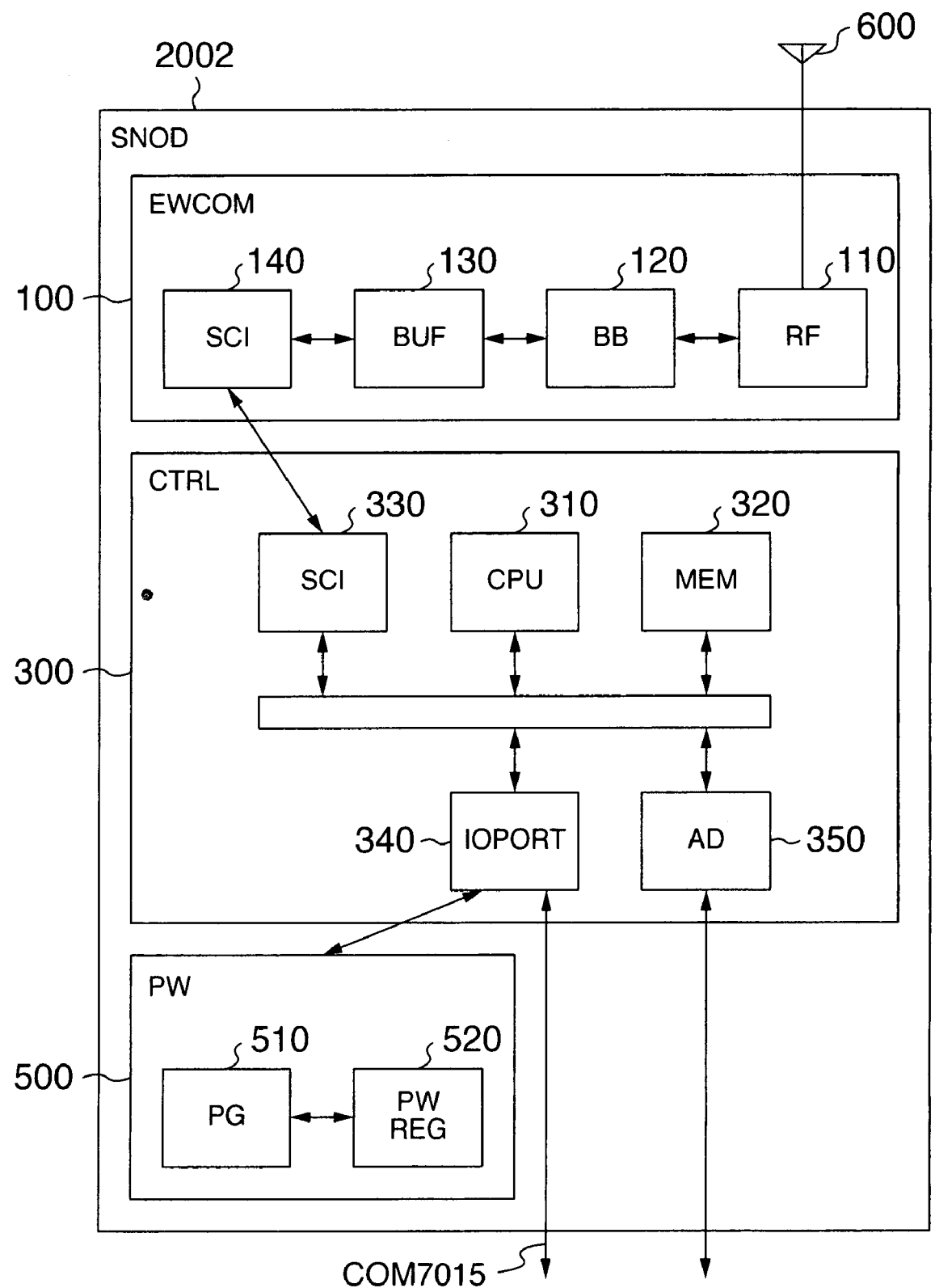
FIG. 14 is a diagram showing the configuration of the radio terminal unit having the sensor function according to a fifth embodiment.

The configuration of the radio terminal unit, 2002 having the sensor function is shown in FIG. 14. In this case, an I/O port 340 is used for data communication (COM7015) between the switches and the motor control unit. In the case where a large capacity of data communication is required, the radio terminal unit 2002 having the sensor function may be replaced by the radio communication repeater 3001 with the cable communication circuit 200.

In the case where it is desired to maintain the vehicle interior at an optimum temperature by monitoring the temperature of the vehicle compartments, a temperature sensor is connected to the A/D converter 350 of the radio terminal unit\\2002 having the sensor function to monitor the temperature. The temperature information obtained by the temperature sensor is transferred by radio communication. In addition, the humidity, acceleration and distortion can also be detected by the radio terminal unit 2002 having the sensor function.

In the case where the radio terminal unit having the sensor function for a door mirror or the like is arranged on the outside of the vehicle frame, the large vibration makes it possible to use the oscillatory power generator effectively.

In the case where the temperature is measured in an environment exposed to the afternoon sun, for example, the radio terminal unit having the sensor function may be used with a solar battery as a power supply. A hybrid configuration of a solar battery and a battery or a rechargeable battery or the like power generator may be another choice. The type of the power generating means is preferably actually selected taking the operating conditions and the mounting conditions into consideration. This increases the freedom of the mounting position of the on-vehicle sensors, switches and motors, while at the same time facilitating the job of installing and removing the devices as a unit.

In the fifth embodiment, the configuration of the radio terminal units and the radio communication repeaters and the communication method between the terminal units, the repeaters, the vehicle control unit, etc. employed in the first to fourth embodiments are applicable also to the various vehicle control operations in a sixth embodiment, as will be understood from the fact that the exhaust gas diagnosis system is a part of the vehicle control system in the broad sense of the words. Specifically, the difference between an observation system and a control system depends simply on whether some control operation is performed using the result of observation, and therefore is not a factor reducing the applicability of this invention. Also, the devices arranged in the compartments can be connected either by radio communication or physical wires. This is also the case with the sixth and seventh embodiments described below.

Sixth Embodiment

Figure 15:
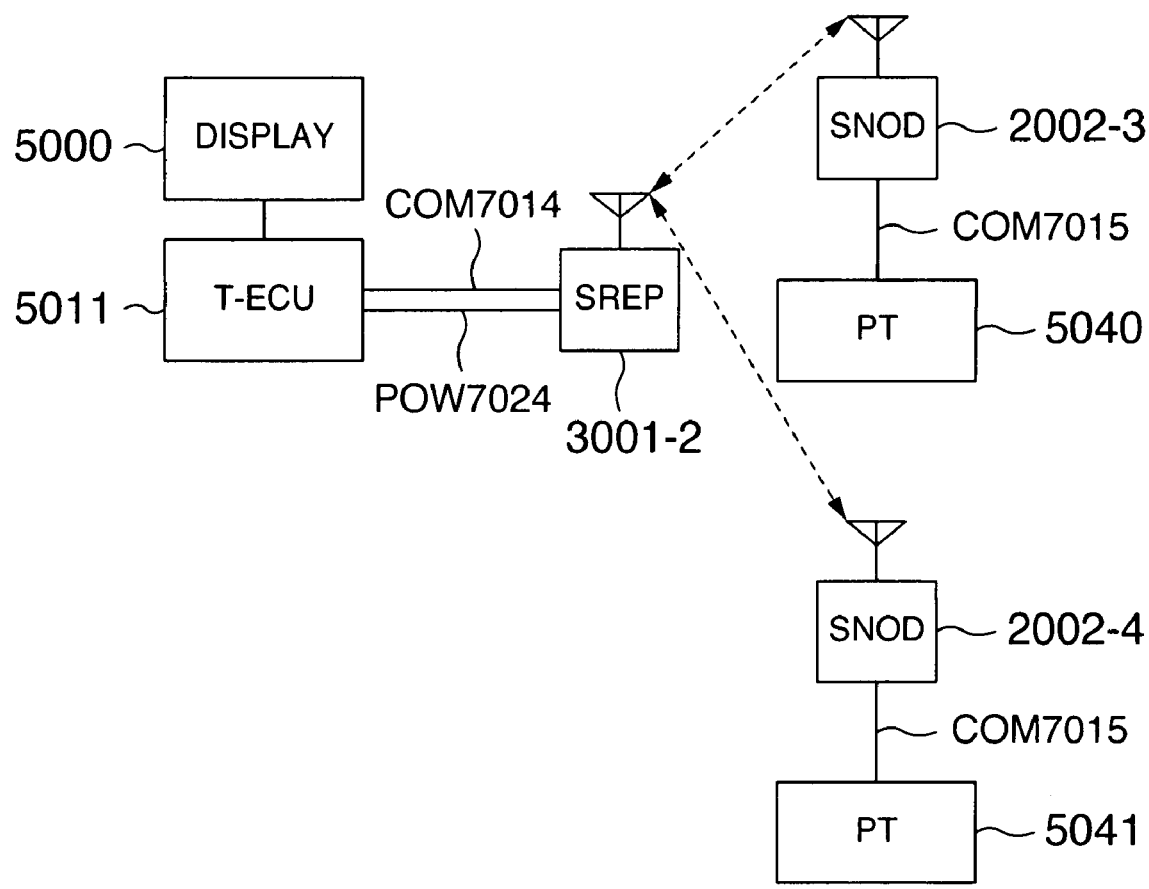
FIG. 15 is a diagram showing the configuration for radio communication according to a sixth embodiment of the invention.

The sixth embodiment of the invention is shown in FIG. 15. According to this embodiment, the radio terminal unit having the sensor function is used to manage the component parts of the vehicle. The component parts 5040, 5041 of the vehicle and the radio terminal units 2002-3, 2002-4 having the sensor function are used in pair to transfer the management information (ID information) of the component parts to the vehicle overall control unit 5011 by radio communication. By connecting the vehicle overall control unit 5011 with an on-vehicle information system network, the information on the component parts can be managed at a vehicle information management center through the information system network. By mounting a temperature sensor on the radio terminal unit 2002 having the sensor function, on the other hand, the temperature history of the operation of the component parts can be acquired. Not only the temperature history, but the history of humidity, acceleration or distortion can of course be acquired in similar fashion.

According to this embodiment, the history and the ID of the operating environment of the component parts can be managed, and therefore an on-vehicle information system having a further improved function can be constructed. Also, the information is transmitted not simply to the external vehicle information center, but can of course be used for the vehicle control operation described above in the fifth embodiment.

Seventh Embodiment

Figure 16:
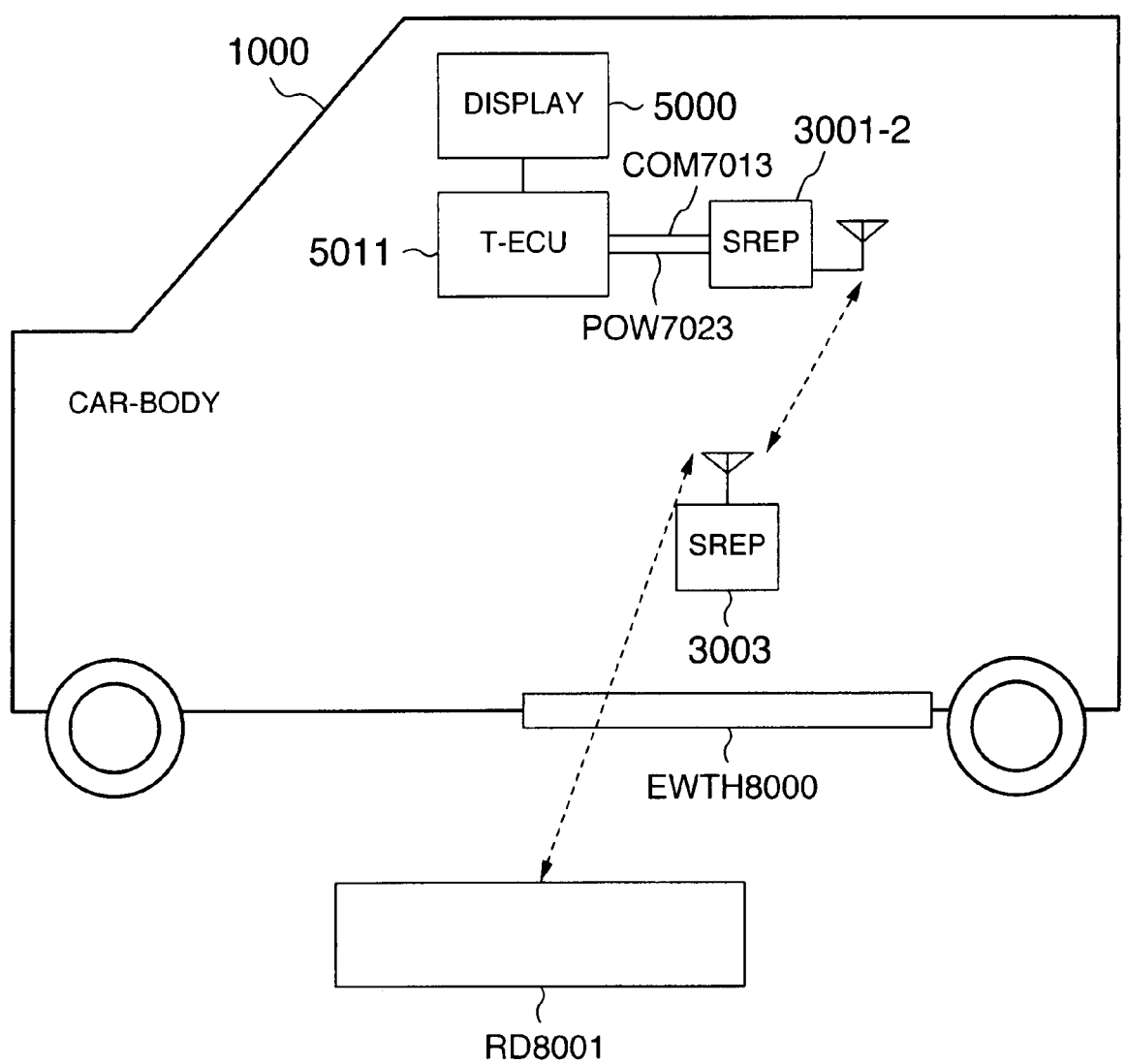
FIG. 16 is a diagram showing the configuration for radio communication according to a seventh embodiment of the invention.

In the future on-vehicle information system, a more comfortable driving environment can be realized by collecting the information from external environments such as roads. As an example, an information transmitter may be embedded in the traffic signals at intersections, pedestrian crossings and manholes. According to this embodiment, an example of collecting the information on the road environments is shown in FIG. 16. The radio wave propagator 8000 making possible radio communication is arranged under the radio communication repeater 3003, so that the radio communication repeater 3003 can receive the information from the information transmitter 8001 on the road. In the case where these external information are propagated from above the vehicle, the radio communication repeater 3003 can be arranged at a position where the information can be received without the radio wave propagator 8000.

According to this embodiment, the internal radio system and the external radio system can be unified, and therefore the cost of the communication system is reduced. In the case where the radio communication repeater installed in the lower part of the vehicle is used as a reader of the RFID (sixth embodiment) mounted on the component parts in the vehicle or the radio terminal devices (seventh embodiment) arranged on the road, the functions of the vehicle and the efficiency of the maintenance operation thereof can be further improved.

Each embodiment described above can of course be variously modified. In the configuration shown in FIG. 2, for example, a plurality of sensors may be connected with one radio terminal unit having the sensor function. In this case, the two sensors arranged before and after the catalytic converter are connected to a single radio terminal unit having the sensor function. Then, the exhaust gas diagnosis system can be configured of a single radio terminal unit having the sensor function.

The sensors may be either built in the radio terminal unit or connected through an external port newly attached to the radio terminal unit. This configuration makes possible a versatile system construction.

The embodiments described above may be implemented either individually or in combination. For example, the fifth embodiment and the seventh embodiment are combined with each other to realize a more sophisticated X-by-wire based on the vehicle conditions and the external information.

An application of the radio communication technique according to this invention to the other control systems in the vehicle and the resulting reduction in the wire harnesses are expected to lead to the advantages that (1) the vehicle weight is reduced and the fuel consumption rate is improved due to the reduced weight, (b) faults of the connectors due to secular variations or the contact failure and disconnection are avoided, (c) the new functions which could not be employed for lack of the wiring space can be added and the arrangement of the component parts can be designed freely, (d) the communication can be established with the rotary component parts (tires, etc.), (e) the production cost part attributable to manual wiring is saved, and (f) the repair cost of the wire harnesses is reduced.

This invention is applicable to not only the sensor network technique for vehicles in which the wire harnesses in the vehicle are replaced by radio communication, but also all other fields of industrial equipment requiring the introduction of radio communication technique to the wire harnesses.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A vehicle control system comprising:
a vehicle control unit to control a vehicle component device;
radio terminal units each having a sensor to monitor the vehicle conditions; and
a radio communication repeater to receive, by radio communication, the vehicle conditions detected by the sensor of the radio terminal units;
wherein the radio communication repeater includes a memory having stored therein a program to determine the vehicle conditions;
wherein the radio communication repeater, upon receipt of a start signal from the vehicle control unit, executes the program and outputs the result of determination of the vehicle conditions; and
wherein the radio communication repeater is arranged inside the vehicle and conducts radio communication with the radio terminal units through a radio wave propagator included in the vehicle.

2. A vehicle control system according to claim 1,
wherein the radio wave propagator is a window formed of a radio wave transmission material in the vehicle.

3. A vehicle control system comprising:
a vehicle control unit to control a vehicle component device;
radio terminal units each having at least a sensor to monitor a vehicle component part;
a first radio communication repeater to receive, by radio communication, the conditions of the vehicle component part detected by the sensory of the radio terminal units; and
a vehicle overall control unit is connected with the first radio communication repeater;
wherein the first radio communication repeater includes a memory having stored therein a program to determine the conditions of the vehicle component part;
wherein the first radio communication repeater executes the program to monitor the conditions of the vehicle component part, and upon detection of a predetermined change in the vehicle component part, outputs the result of determination of the conditions of the vehicle component part to the vehicle overall control unit;
wherein the vehicle overall control unit transmits the first control information corresponding to the predetermined change in the vehicle component part received to the vehicle control unit; and
wherein the sensor of the radio terminal units is configured to detect at least selected one of the on/off switch operation, temperature, humidity, acceleration and distortion.

4. A vehicle control system according to claim 3, further comprising a second radio communication repeater to receive the external information transmitted from a source external to the vehicle;
wherein the external information received by the second radio communication repeater is transmitted to the first radio communication repeater;
wherein the first radio communication repeater includes a memory having stored therein a program to determine the contents of the external information;
wherein the first radio communication repeater executes the program to monitor the contents of the external information and, upon detection of a change in the contents of the external information, outputs the external information to the vehicle overall control unit; and
wherein the vehicle overall control unit transmits the second control information corresponding to the external information received to the vehicle control unit.

5. A vehicle control system according to claim 4,
wherein the vehicle overall control unit transmits the conditions of the vehicle component device acquired through the radio terminal units to a vehicle information management center through an on-vehicle information system.

6. A vehicle control system according to claim 3,
wherein the radio terminal unit includes either a battery or a power generator and operates on the power supplied from the battery or the power generator.

7. A vehicle control system according to claim 6,
wherein the power generator generates power from at least selected one of vibration, light and heat.

8. A vehicle control system according to claim 3,
wherein the first radio communication repeater is arranged inside the vehicle and conducts radio communication with the radio terminal units through a radio wave propagator included in the vehicle.

9. A vehicle control system according to claim 8,
wherein the radio wave propagator is a window formed of a radio wave propagating material included in the vehicle.

* * * * *